(12) United States Patent
Nair et al.

(10) Patent No.: US 7,084,945 B2
(45) Date of Patent: Aug. 1, 2006

(54) COMPENSATOR HAVING PARTICULAR SEQUENCE OF FILMS AND CROSSLINKED BARRIER LAYER

(75) Inventors: Mridula Nair, Penfield, NY (US); Charles L. Bauer, Webster, NY (US); Bradley M. Houghtaling, Rochester, NY (US); Jeffrey A. Trest, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 282 days.

(21) Appl. No.: 10/194,162

(22) Filed: Jul. 12, 2002

(65) Prior Publication Data

US 2004/0008304 A1 Jan. 15, 2004

(51) Int. Cl.
  *G02F 1/1333* (2006.01)
  *G02F 1/1335* (2006.01)

(52) U.S. Cl. ........................ 349/122; 349/117
(58) Field of Classification Search ................. 349/117
See application file for complete search history.

(56) References Cited

U.S. PATENT DOCUMENTS

| | | | |
|---|---|---|---|
| 4,735,492 A * | 4/1988 | Sekine et al. ............... | 349/136 |
| 5,518,783 A * | 5/1996 | Kawata et al. ............... | 428/1.1 |
| 5,583,679 A | 12/1996 | Ito et al. | |
| 5,619,352 A * | 4/1997 | Koch et al. .................... | 349/89 |
| 5,880,800 A * | 3/1999 | Mikura et al. ............... | 349/122 |
| 6,025,900 A * | 2/2000 | Yoon et al. .................. | 349/124 |
| 6,061,113 A | 5/2000 | Kawata | |
| 6,081,312 A | 6/2000 | Aminaka et al. | |
| 6,559,915 B1 * | 5/2003 | Amimori et al. ........... | 349/112 |
| 2002/0041352 A1 | 4/2002 | Kuzuhara et al. | |
| 2002/0063827 A1 * | 5/2002 | Wu ............................ | 349/117 |
| 2002/0102368 A1 | 8/2002 | Ono et al. | |
| 2003/0067572 A1 * | 4/2003 | Umeda et al. .............. | 349/117 |

FOREIGN PATENT DOCUMENTS

| | | |
|---|---|---|
| EP | 1 143 271 | 10/2001 |
| JP | 2002-14233 | 1/2002 |

OTHER PUBLICATIONS

C. L. Bauer et al. "Nematic Liquid Crystal Compensator with Barrier Layer and Process", U.S. Appl. No. 10/194,130, (D-84839) filed Jul. 12, 2002.

* cited by examiner

*Primary Examiner*—Andrew Schechter
*Assistant Examiner*—Jeanne Andrea Di Grazio
(74) *Attorney, Agent, or Firm*—Arthur E. Kluegel

(57) ABSTRACT

Disclosed is an optical compensator for a liquid crystal display comprising a transparent polymeric support, an orientation layer, and an optically anisotropic layer, in order, and located between the support and the orientation layer, a barrier layer comprising a crosslinked polymer impermeable to the components of the support. Embodiments exhibit improved optical properties.

22 Claims, 4 Drawing Sheets

COMPENSATOR HAVING PARTICULAR SEQUENCE OF FILMS AND CROSSLINKED BARRIER LAYER

CROSS-REFERENCE TO RELATED APPLICATIONS

This application is cofiled as part of a group of the following commonly assigned applications: Ser. No. 10/195,093 filed Jul. 12, 2002; now abandoned; Ser. No. 10/195,094 filed Jul. 12, 2002, now abandoned; Ser. No. 10/194,097 filed Jul. 12, 2002 now abandoned in favor of 10/985,612 filed Nov. 10, 2004; Ser. No. 10/194,823 filed Jul. 12, 2002; Ser. No. 10/194,750 filed Jul. 12, 2002; Ser. No. 10/194,130 filed Jul. 12, 2002; and Ser. No. 10/194,100 filed Jul. 12, 2002 now U.S. Pat. No. 6,582,775; the contents of which are incorporated herein by reference.

FIELD OF THE INVENTION

The present invention relates to an optical compensator for a liquid crystal display comprising a transparent support, an orientation layer, and an optically anisotropic layer, in order, and located between the support and the orientation layer, a barrier layer comprising a crosslinked polymer impermeable to the components of the support. The invention also relates to a method for the preparation of the optical compensator and a liquid crystal display using the optical compensator.

BACKGROUND OF THE INVENTION

A typical liquid crystal display comprises a liquid crystal element or cell, a polarizing sheet and an optical compensator (phase retarder) provided between the liquid crystal cell and the polarizing sheet.

Current rapid expansion in the liquid crystal display (LCD) applications in various areas of information display is largely due to improvements of display qualities. Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cells, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

Thus, one of the major factors measuring the quality of such displays is the viewing angle characteristic, which describes a change in contrast ratio from different viewing angles. It is desirable to be able to see the same image from a wide variation in viewing angles and this ability has been a shortcoming with liquid crystal display devices. One way to improve the viewing angle characteristic is to insert a compensator (also referred as compensation film, retardation film, or retarder) with proper optical properties between the polarizer and liquid crystal cell, such as disclosed in U.S. Pat. No. 5,583,679 (Ito et al.), U.S. Pat. No. 5,853,801 (Suga et al.), U.S. Pat. No. 5,619,352 (Koch et al.), U.S. Pat. No. 5,978,055 (Van De Witte et al.), and U.S. Pat. No. 6,160,597 (Schadt et al.). A compensation film according to U.S. Pat. No. 5,583,679 (Ito et al.) and U.S. Pat. No. 5,853,801 (Suga et al.), based on discotic liquid crystals which have negative birefringence, is widely used. It offers improved contrast over wider viewing angles. However, it suffers larger color shift for gray level images, compared to a compensator made of liquid crystalline materials with positive birefringence, according to Satoh et al. ("Comparison of nematic hybrid and discotic hybrid films as viewing angle compensator for NW-TN-LCDs", SID 2000 Digest, pp. 347–349, (2000)). To achieve comparable performance in the contrast ratio while reducing color shift, one alternative is to use a pair of crossed liquid crystal polymer (LCP) films on each side of liquid crystal cell, as discussed by Chen et al. ("Wide Viewing Angle Photoaligned Plastic Films", SID 99 Digest, pp.98–101 (1999)). This paper states that "since the second LPP/LCP retarder film is coated directly on top of the first LCP retarder film, the total thickness of the final wide-view retarder stack is only a few microns thin". Although they provide very compact optical component, one of the challenges of this method is to make two LCP layers crossed, particularly in a continuous roll to roll manufacturing process.

In a liquid crystal cell comprising a pair of substrates, a rod-like liquid crystal compound and an electrode layer, the rod-like liquid crystal compound is provided between the substrates. The electrode layer has a function of applying a voltage to the rod-like liquid crystal compound. Each of the substrates has an orientation layer (both-sided orientation layers), which has a function of aligning the rod-like liquid crystal compound. The orientation layer of the liquid crystal cell is usually prepared by forming a polymer (e.g., polyimide, polyvinyl alcohol) membrane on the substrate, and rubbing the membrane with a cloth uniformly.

The alignment of the liquid crystal molecules using a linearly photopolymerizable polymer (LPP) is an alternate method that can improve yield and cost of LCDs. An LPP layer is applied to the surfaces of the LCD substrates and optically aligned, thereby generating the required alignment and bias tilt angle for the liquid crystal molecules in the display. This process replaces the mechanical brushing of the polyimide layer described above that is used in the industry today, and offers a number of distinct advantages. Alignment of the liquid crystals can be in more than one direction within the display. Hence, single or multi-domain pixel structures with sub-micron resolution can be generated, resulting, for example, in novel displays with in-built temperature independent viewing angle compensation. Optical alignment is a non-mechanical, non-contact process, which does not generate dust particles or electrostatic charge, which can damage the TFT's and reduce the yield. Furthermore, the process can be integrated into the manufacturing line and offers the possibility to reduce the overall manufacturing cost. The LPP materials are easy to apply, using conventional coating techniques such as printing or spin-coating. Application can also be carried out on a continuous, roll-to-roll web onto flexible polymer substrates, for use in the manufacture of plastic LCD's. By applying a thin film of an LCP material on top of the LPP layer, and by combining various LPP/LCP layers, as discussed earlier, a wide range of new optically anisotropic solid-state thin-film devices can be created. By varying the composition of the LCP layers, the characteristics of the resultant film (e.g. anisotropy, dispersion, transmission) can be adjusted to suit the end use. Specific design of the formulation of the LCP mixture can also generate the required operating temperature for the manufacture of the films. The resultant effects can be applied to a wide variety of optical displays and devices, giving rise to performance improvements and the generation of new devices.

U.S. Pat. No. 5,583,679, U.S. Pat. No. 6,061,113, and U.S. Pat. No. 6,081,312 describe the use of subbing or undercoat layers to improve the adhesion of an alignment layer and an optically anisotropic layer comprising a discotic liquid crystal material to the support.

It is a problem to be solved to provide an optical compensator that widens the viewing angle characteristics of liquid crystal displays, in particular Twisted Nematic (TN), Super Twisted Nematic (STN), Optically Compensated Bend (OCB), In Plane Switching (IPS), or Vertically Aligned (VA) liquid crystal displays, and is readily manufactured, does not cause unwanted curl of the support and improves the ability of the LPP to align. These various liquid crystal display technologies have been reviewed in U.S. Pat. No. 5,619,352 (Koch et al.), U.S. Pat. No. 5,410,422 (Bos), and U.S. Pat. No. 4,701,028 (Clerc et al.).

The ability to provide the orientation layer at the point of manufacture of the plastic support is a highly desired feature. However, in order to accomplish this feature, the orientation layer should be impermeable to the components of the support, such as plasticizers, UV stabilizers, low molecular weight polymers derived from the support polymer and other additives. This becomes particularly challenging when the LPP layer is coated from an essentially all organic solvent. Such solvents are typically used in high speed film support manufacturing. Typically the LPP layer is extremely thin (under 3 microns) and at the same time functions as the orientation layer for the subsequent LCP layer. Thus, quality of the layer is especially critical and must not adversely affect the optical alignment of the layer since the orientation of the LCP is dependent on efficient alignment of the LCP layer. Contaminants can adversely affect the alignment process.

U.S. Pat. Nos. 6,061,113 and 6,081,312 teach compensator plates for liquid crystal cells but do not provide the desired protection from the migration of support components in the case of polymeric supports. U.S. Pat. No. 5,583,679 also teaches the use of a hardened gelatin layer as a second subbing layer to promote adhesion of the optical alignment layers to the support but no mention is made of the migration of contaminants from the support to the orientation layer.

Therefore, there exists a need for an optical compensator for a liquid crystal display that widens the viewing angle characteristics of liquid crystal displays without significantly degrading the optical properties of the display.

SUMMARY OF THE INVENTION

The present invention provides an optical compensator for a liquid crystal display comprising a transparent polymeric support, an orientation layer, and an optically anisotropic layer, in order, and located between the support and the orientation layer, a barrier layer comprising a crosslinked polymer impermeable to the components of the support. The invention also relates to a method for the preparation of the optical compensator and a liquid crystal display using the optical compensator.

The optical compensator widens the viewing angle characteristics of liquid crystal displays without significantly degrading the optical properties of the display, and in particular of Twisted Nematic (TN), Super Twisted Nematic (STN), Optically Compensated Bend (OCB), In Plane Switching (IPS), or Vertically Aligned (VA) liquid crystal displays.

DETAILED DESCRIPTION OF THE INVENTION

Figure 1:
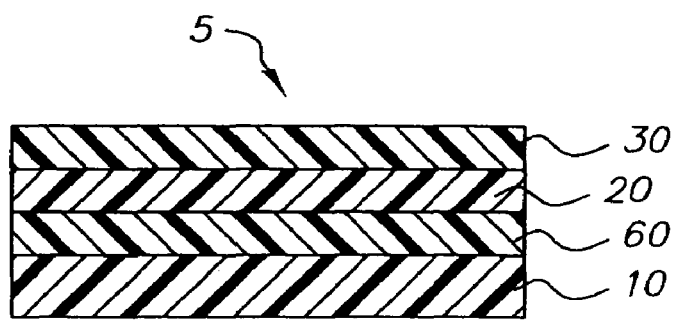
FIG. 1 is a cross-sectional schematic view of a compensator of the present invention.

The invention is described above. As used herein the term "impermeable" when applied to a layer means that the layer substantially impedes the passage of components in the support layer from passing into the orientation (LPP) layer.

The current invention regarding the optical compensator for liquid crystal displays is described by referring to the drawings as follows.

FIG. 1 shows a cross-sectional schematic view of an optical compensator 5 according to the present invention. This compensator comprises a substrate 10 of transparent material, such as a polymer. It should be understood that to be called as a substrate, a layer must be solid and mechanically strong so that it can stand alone and support other layers. A typical substrate is made of triacetate cellulose (TAG), polyester, polycarbonate, polysulfone, polyether sulfone, cellophane, aromatic polyamide, polyethylene, polypropylene, polyvinyl alcohol, or other transparent polymers, and has a thickness of 25 to 500 micrometers. Substrate 10 typically has low in-plane retardation, preferably less than 10 nm, and more preferably less than 5 nm. In some other cases, the substrate 10 may have larger in-plane retardation between 15 to 150 nm. Typically, when the substrate 10 is made of triacetyl cellulose, it has out-of-plane retardation around −40 nm to −120 nm. This is a desired property when the compensator is designed to compensate a liquid crystal state with an ON voltage applied. The in-plane retardation discussed above is defined as the absolute value of $(n_x-n_y)d$ and the out-of-plane retardation discussed above is defined as $[n_z-(n_x+n_y)/2]d$, respectively. The refractive indices $n_x$ and $n_y$ are along the slow and fast axes in plane of the substrate, respectively, $n_z$ is the refractive index along the substrate thickness direction (Z-axis), and d is the substrate thickness. The substrate is preferably in the form of a continuous (rolled) film or web.

On the substrate 10, a barrier layer 60 is applied, an orientation layer 20 is disposed on top of layer 60 and an anisotropic liquid crystal layer 30 is disposed on top of layer 20.

The barrier layer 60 comprises a crosslinked polymer derived from one or more of the following waterborne or organic soluble resins, containing functional groups such as carboxylic, hydroxyl, amino or epoxy groups, such as melamine resins, guanamine resins, epoxy resins, diallyl phthalate resins, phenoxy and phenolic resins, alkyd and unsaturated polyester resins, polyurethane resins, polyolefin resins, aminoalkyd resins, melamine-urea copolycondensed resins, silicone and polysiloxane resins, certain types of acrylic and vinyl polymers, hydrogels such as polyvinyl alcohol and gelatin, and cellulosics such as nitrocellulose, ethyl cellulose, hydroxyethyl cellulose and carboxylated cellulose derivatives. Crosslinked polymers useful for the preparation of barrier layers of this invention are derived from reactions of the above defined crosslinkable functional groups with polyfunctional compounds containing groups such as isocyanate groups, epoxy groups, aziridene groups, oxazoline groups, aldehyde groups, carbonyl groups, hydrazine groups, methanol groups and active methylene groups. Also, a vinylsulfonic acid, an acid anhydride, a cyanoacrylate derivative, an etherified methylol, an ester or a metal alkoxide such as urethane and tetramethoxysilane can be used to introduce the crosslinked structure. A functional group which exhibits the crosslinking property as a result of the decomposition reaction such as blocked isocyanate may also be used. The crosslinkable group for use in the present invention is not limited to these compounds but may be a group which exhibits reactivity after the decomposition of the above described functional groups.

Crosslinked polymers are also called network polymers or thermosets. Suitable barrier layers are those that are "impermeable" or substantially impedes the passage of components in the support layer from passing into the orientation layer and do not by themselves poison the orientation layer as a results of their components. Suitable examples of crosslinked barrier layer polymers, useful in the practice of this invention are those derived from, melamine resins, acrylic resins, urethane resins, vinyl-urethane hybrid resins, vinyl resins, vinyl-acrylic resins, polyethylene resins, phenol formaldehyde resins, epoxy resins, amino resins, urea resins, and unsaturated polyester resins. Conveniently used examples are melamine resins, acrylic resins, urethane resins and polyethylene resins. More conveniently used examples are those derived from melamine resins.

An example of a crosslinkable resin that is commercially available is Cymel 300, a hexamethoxymelamine from Cytec Industries Inc. An example of a polyfunctional crosslinker useful in this invention is CX100, a trifunctional crosslinker, from NeoResins (a division of Avecia). An example of an acrylic resin useful in this invention is NeoCryl A633, from NeoResins (a division of Avecia). An example of a urethane resin useful in this invention is NeoRez R600, from NeoResins (a division of Avecia). An example of a vinyl-acrylic resin useful in this invention is Haloflex HA-202S, a vinyl-acrylic terpolymer from NeoResins (a division of Avecia).

In addition the barrier layer of this invention may also optionally comprise diluent polymers or resins such as polymethyl(meth)acrylates and other acrylic polymers, styrenic and other vinyl polymers, polyesters, polyurethanes, nitrile resins and the like.

Examples of solvents employable for coating the barrier layer into the polar solvents such as water, methanol, ethanol, n-propanol, isopropanol, and n-butanol, non polar solvents such as cyclohexane, heptane, toluene and xylene, alkyl halides such as dichloromethane and dichloropropane, esters such as methyl acetate, ethyl acetate, propyl acetate and butyl acetate, ketones such as acetone, methyl isobutyl ketone, methyl ethyl ketone, γ-butyrolactone and cyclopentanone, cyclohexanone, ethers such as tetrahydrofuran and 1,2 dimethoxyethane, or mixtures thereof. With the proper choice of solvent, adhesion between the transparent plastic substrate film and the coating resin can be improved while the surface of the transparent plastic substrate film is not whitened, enabling the transparency to be maintained. Suitable solvents are methanol, mixtures of water and methanol, and propyl acetate.

After coating, the resin or the material having the crosslinkable groups must be crosslinked by heat or the like. For resins such as melamine resins an acid catalyst such as p-toluene sulfonic acid (PTSA) is used as a catalyst to accelerate the crosslinking reaction.

Resins useful as barrier layers of this invention may also be crosslinked using radiation curing such as ultraviolet or electron beam irradiation, and is preferably one having an acrylate functional group, and examples thereof include relatively low-molecular weight polyester resin, polyether resin, acrylic resin, epoxy resin, urethane resin, urethane-acrylic resins, alkyd resin, spiroacetal resin, polybutadiene resin, and polythiol-polyene resin, oligomers or prepolymers of (meth)acrylate (the term "(meth)acrylate" used herein referring to acrylate and methacrylate) or the like of polyfunctional compounds, such as polyhydric alcohols, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth) acrylate. When the ionizing radiation-curable resin is used as an ultraviolet-curable resin, a photo polymerization initiator is incorporated into the ionizing radiation curable resin composition. Preferred radiation curable resins include acrylic, urethane, urethane-acrylic and epoxy resins.

Additionally an auxiliary layer on top of or below the crosslinkable polymer layer may be applied to improve adhesion.

The crosslinkable polymer layer is suitably applied at dry coverages between 0.10 to 10 g/m$^2$, preferably between 0.55 and 5 g/m$^2$.

The crosslinkable polymer is applied to the transparent support by known coating techniques. It may be dried using conventional techniques.

The crosslinkable polymer as described above may be applied to one or both sides of the transparent support.

The orientation layer 20 can be oriented by the following technique. The orientation layer contains a photo-orientable or photo-alignable material and can be oriented by a photo-alignment technique. Photo-orientable materials include, for example, photo isomerization polymers, photo dimerization polymers, and photo decomposition polymers. In a preferred embodiment, the photo-orientable materials are cinnamic acid derivatives as disclosed in U.S. Pat. No. 6,160,597. Such materials may be oriented and simultaneously crosslinked by selective irradiation with linear polarized UV light.

The photo-alignment process may be accomplished by using an apparatus as described in a commonly assigned and cofiled application under U.S. Ser. No. (Attorney Docket No. 84833), the contents of which are incorporated herein by reference.

The anisotropic layer 30 is typically a liquid crystalline monomer when it is first disposed on the orientation layer 20, and is crosslinked by a further UV irradiation, or polymerized by other means such as heat. In a preferred embodiment, the anisotropic layer contains a material such as a diacrylate or diepoxide with positive birefringence as disclosed in U.S. Pat. No. 6,160,597 (Schadt et al.) and U.S. Pat. No. 5,602,661 (Schadt et al.). The optic axis in the anisotropic layer 30 is usually tilted relative to the layer plane, and varies across the thickness direction.

The anisotropic layer may also contain addenda such as surfactants, light stabilizers and UV initiators. UV initiatiors include materials such as benzophenone and acetophenone and their derivatives; benzoin, benzoin ethers, benzil, benzil ketals, fluorenone, xanthanone, alpha and beta naphthyl carbonyl compounds and ketones. Preferred initiators are alpha-hydroxyketones.

While this type of compensator described above provides some desired optical properties, it is not sufficient in many applications, for example, as a compensator for Twisted Nematic (TN) Liquid Crystal Displays (LCDs).

Figure 2A:
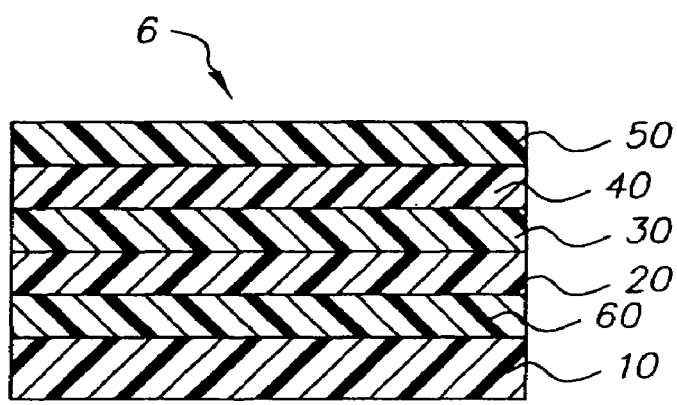
FIGS. 2A and 2B are cross-sectional schematic views of various embodiments of the present invention.

FIG. 2A illustrates a more sophisticated optical compensator 6 of the invention that contains a second orientation layer 40 and a second anisotropic layer 50 on top of the first anisotropic layer 30. The second orientation layer 40 and the second anisotropic layer 50 are made essentially in the same way as the first orientation layer 20 and the first anisotropic layer 30 are made, except that the direction of the orientation may vary.

Figure 3:
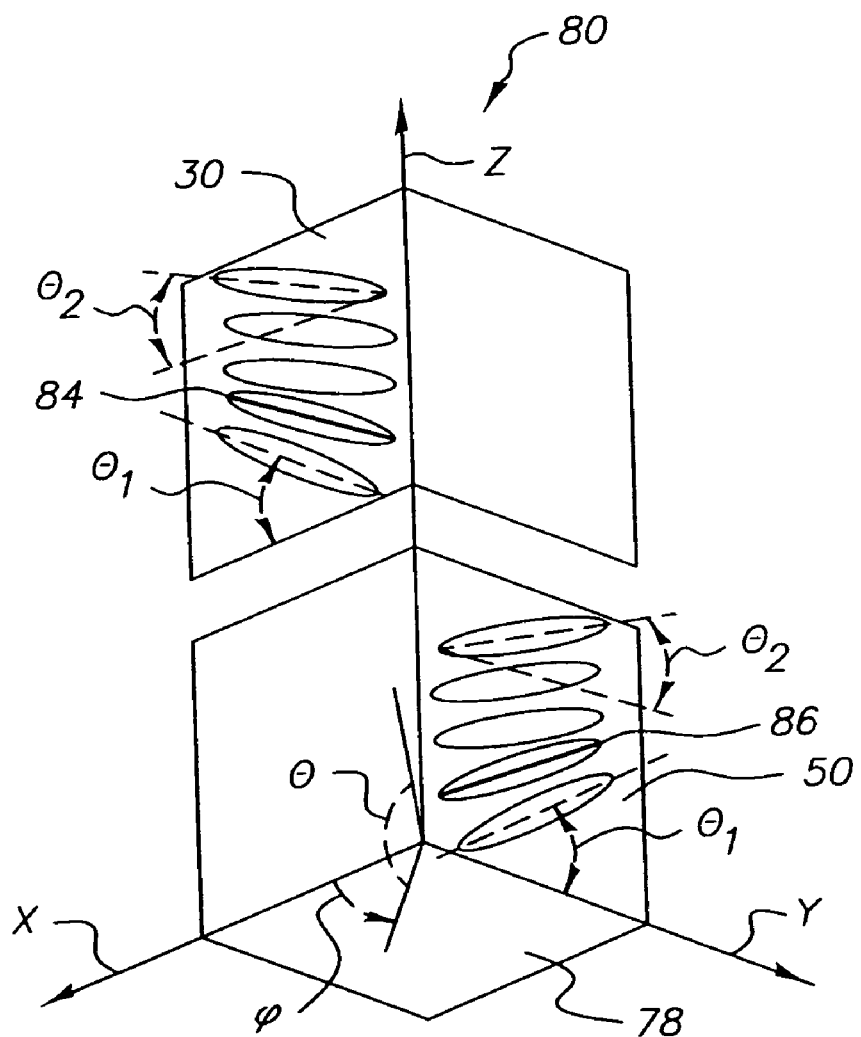
FIG. 3 is a schematic concept in accordance with the present invention.

FIG. 3 illustrates an XYZ coordinate system 80. The X and Y axes are parallel to the plane of substrate 78, and the Z-axis is perpendicular to the plane of substrate 78. The angle $\phi$ is measured from the X-axis in the XY plane, and referred as an azimuthal angle. The angle $\theta$ is measured from the XY plane, and referred as a tilt angle.

It should be understood that the optic axis in each of the anisotropic layers 30 and 50 can have a variable tilt angle and/or variable azimuthal angle. For example, the optic axis 84 in the anisotropic layer 30 has a variable tilt angle $\theta$ across the Z-axis ranging from $\theta_1$ to $\theta_2$. In another example, the optic axis 84 has a fixed tilt angle $\theta$ across the Z-axis, namely, $\theta_1=\theta_2$. In another example, the optic axis 84 is contained in one plane such as the X-Z plane and consequently has a fixed azimuthal angle $\phi$ across the Z-axis. In another example, although the anisotropic layer 30 is still oriented along the preferred direction forced by the orientation layer at their interface, the optic axis 84 has a variable azimuthal angle $\phi$ across the Z-axis. The azimuthal angle of the optic axis 84 can be varied by adding a proper amount of chiral dopant into the anisotropic layer 30. In another example, the optic axis 84 has a variable tilt angle $\theta$ and a variable azimuthal angle $\phi$ across the Z-axis. Like the optic axis 84 of the anisotropic layer 30, the optic axis 86 of the anisotropic layer 50 can also have a fixed tilt angle, a variable tilt angle, a fixed azimuthal angle, a variable azimuthal angle, or a variable tilt angle and a variable azimuthal angle across the Z-axis. The anisotropic layers 30 and 50 typically have different optic axis. Preferably the anisotropic layer 30 is positioned orthogonally relative to the respective optic axis of the anisotropic layer 50 about an axis perpendicular to the plane of the substrate. Even though the optic axis of the anisotropic layer 30 is preferred to be orthogonal (or ±90 degrees) relative to the respective (or counterpart) optic axis of the anisotropic layer 50 about an axis perpendicular to the plane of the substrate, it should be understood that the angle between the optic axis of the two anisotropic layers can be in a range of 85 to 95 degrees to be considered as orthogonal.

For the manufacture of more complex layer structures than that illustrated in FIG. 2A, additional orientation and anisotropic layers can be applied in further steps.

Figure 2B:
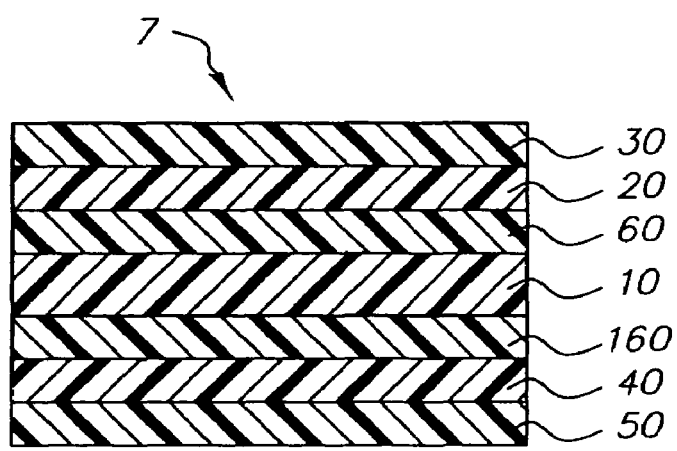

FIG. 2B illustrates another optical compensator 7 of the invention in which the second orientation layer 40 and the second anisotropic layer 50 are on the opposite side of the substrate from the first orientation layer 20 and the first anisotropic layer 30 and separated from the support by a second barrier layer 160 which may be the same or different from the first barrier layer.

Figure 5:
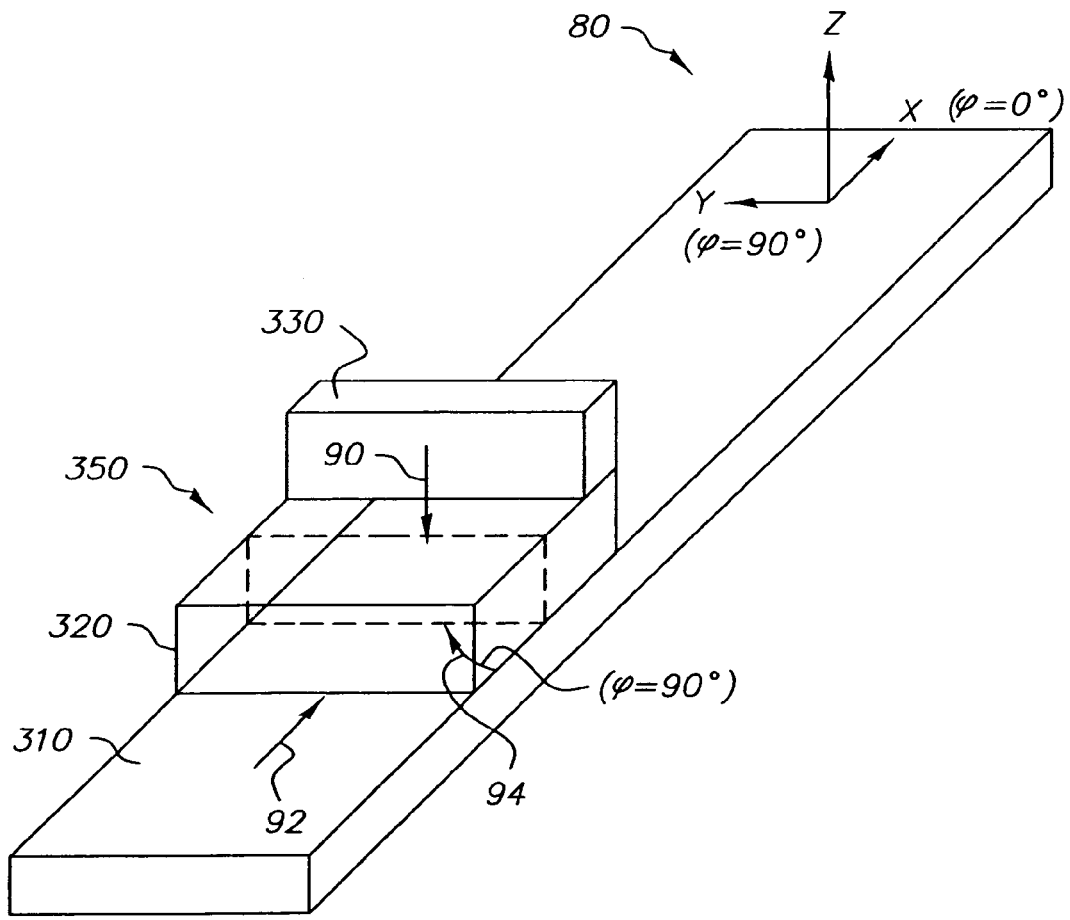
FIG. 5 shows a roll-to-roll process for making a compensator according to the present invention.

FIG. 5 shows another aspect of the present invention. A compensator 350 can be manufactured on a continuous roll-to-roll basis as shown in FIG. 5 which shows part of a schematic view of the process. The roll-to-roll process of forming a compensator 350 comprises the steps of applying a photo-alignable orientation layer 320, for example by coating by any known method such as extrusion hopper coating, roll-coating, slide hopper coating, or curtain coating, the orientable material in a solvent, onto a moving substrate 310, drying the orientation layer 320, photo-aligning (orienting) the orientation layer 320 in a predetermined alignment direction $\phi$ 94, (for the purpose of illustration $\phi=90°$) relative to the roll moving direction 92, coating (as described earlier) an anisotropic layer 330 comprising a polymerizable material in a solvent carrier onto the orientation layer 320, drying the anisotropic layer 330, polymerizing the anisotropic layer 330 to form a continuous web of compensator. Note that for clarity, FIG. 5 only shows part of the orientation layer 320 and anisotropic layer 330.

In one embodiment, the orientation layer is oriented by rubbing the orientation layer in a direction 94 of 90 degrees ($\phi=90°$) relative to the roll moving direction 92. In another embodiment, the orientation layer is oriented by a photo-alignment technique, for example, the orientation layer is exposed to a linearly polarized ultraviolet (UV) light indicated by 90. It may or may not be collimated, however, the projection (pointing along 94) of the principal ray of the light 90 onto the roll makes an angle of about 90 degrees relative to the roll moving direction.

Figure 4:
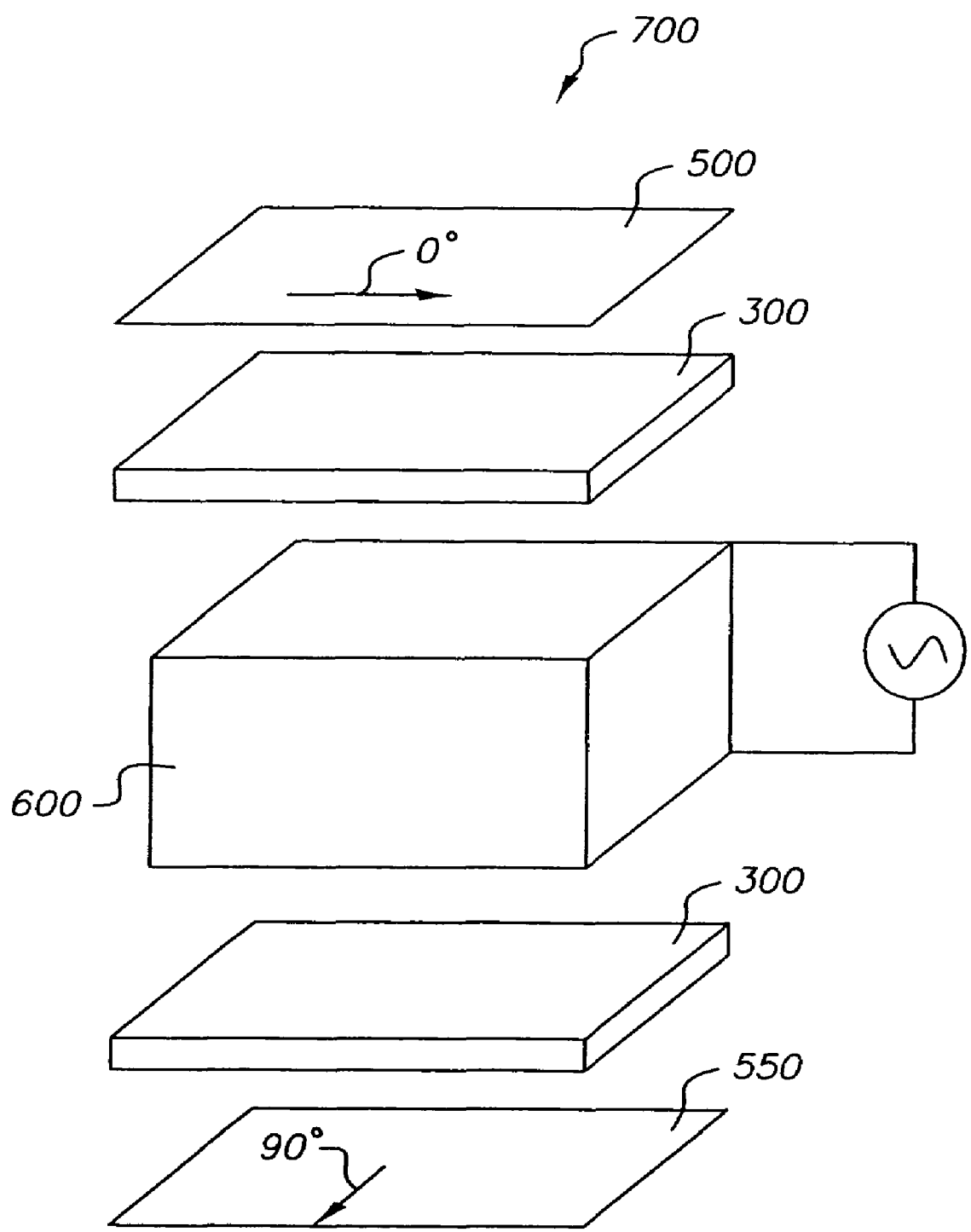
FIG. 4 shows a liquid crystal display in combination with a compensator according to the present invention.

FIG. 4 is a schematic view of a liquid crystal display 700 comprising one compensator 300 placed between the first polarizer 500 and the liquid crystal cell 600, and another compensator 300 placed between a second polarizer 550 and the liquid crystal cell 600. The liquid crystal cell 600 is preferred to be operated in a Twisted Nematic (TN), Super Twisted Nematic (STN), Optically Compensated Bend (OCB), In Plane Switching (IPS), or Vertically Aligned (VA) mode. The polarizers 550 and 500 can be arranged crossed or parallel depending on the operation principles of the liquid crystal cell. The orientation layer in the compensator can be arranged parallel, perpendicular, or at a predetermined angle relative to the first polarizer 500. The liquid crystal cell can also be operated in a reflective mode, in which it may only require one polarizer.

The invention may be used in conjunction with electronic imaging device comprising a liquid crystal display device. The energy required to achieve this control is generally much less than that required for the luminescent materials used in other display types such as cathode ray tubes. Accordingly, liquid crystal technology is used for a number of applications, including but not limited to digital watches, calculators, portable computers, electronic games for which light weight, low power consumption and long operating life are important features.

Embodiments of the invention are readily manufactured, do not cause unwanted curl of the support and improve the ability of the orientation layer to align.

The present invention is illustrated in more detail by the following non-limiting examples.

EXAMPLES

Cymel 300 was obtained from Cytec industries Inc. CX100, Haloflex 202S, NeoCryl A633 and NeoRez R600 were obtained from NeoResins (a division of Avecia). Chem Corr Emulsion 260, an anionic polyethylene emulsion was obtained from Chemical Corporation of America. The LCP polymer Staralign 2110MEK (polyvinyl cinnamate with an alpha-hydroxyketone photoinitiator) and the diacrylate nematic liquid crystal (LCP) prepolymer, CB483MEK (30% active) were obtained from Vantico.

Example 1

(Barrier Layer)

A coating solution of the following composition containing Cymel 300 was coated on 127 micron thick triacetyl cellulose to create a barrier layer using an extrusion hopper. PTSA was used as the acid catalyst to crosslink the Cymel 300 coating. The coated layer was dried and crosslinked at 115° C. for 2 minutes to form a transparent barrier layer having a dried weight of 3.23 g/m$^2$.

| | |
|---|---|
| Methanol | 44.13% |
| Butanol | 10.54% |
| Cymel 300 | 33.33% |
| PTSA (10% solution in methanol) | 12% |

(LPP Orientation Layer)

On top of the crosslinked Cymel 300 polymer layer a photoalignment layer was coated from the following solution at a wet coverage of 16.5 g/m$^2$. After drying to remove solvents, the sample was exposed to linearly polarized UVB light at a 20 degree angle.

| | |
|---|---|
| Staralign 2110MEK (2% solution) | 23.30% |
| Methyl ethyl ketone | 13.95% |
| Cyclohexanone | 22.75% |
| n-Propyl acetate | 40.00% |

(Optically Anisotropic Layer LCP)

A solution of a diacrylate nematic liquid crystal material, CB483(MEK) of the following composition was coated onto the orientation layer at a wet coverage of 9.33 g/m$^2$ and dried. After drying, the coated structure was exposed to 400 mJ/cm$^2$ of UVA to crosslink the liquid crystal layer.

| | |
|---|---|
| LCP CB483MEK (30% active) | 29.00% |
| Toluene | 62.00% |
| Ethyl acetate | 9.00% |

The sample from Example 1 was then evaluated for coating defects (curl or bubbles in the coatings) and contrast, which is the ability to form a light and dark state when rotated between crossed polarizers with backlighting and compared to a check sample which was the made using the same procedure as Example1 except that the LPP LCP layers were coated on bare triacetyl cellulose without the Cymel barrier layer.

TABLE 1

| # | TAC thickness (μm) | Crosslinked Barrier Layer | Dry Coverage g/m$^2$ | Curl or Bubble Effects | Contrast |
|---|---|---|---|---|---|
| Comp 1 | 127 | N | — | Y | N |
| 1 | 127 | Y | 3.23 | N | Y |

No curl or bubbles were detected and Example 1 showed good contrast between the dark and bright state compared to the check coating, which showed no contrast under similar conditions. The existence of contrast and the lack of curl and bubbles for the sample containing the crosslinked barrier layer generated from Example 1 and the lack of contrast but presence of curl and bubbles in the comparative example demonstrates the ability of the barrier layer to substantially impede the passage of components from the support into the LPP orientation layer coated over it.

Examples 2–4

The following resins were spin coated at 1000 rpm on glass plates using water as the coating solvent. The coated layer was dried and crosslinked at 80° C. for 5 minutes to form transparent barrier layers. The orientation and optically anisotropic layers were subsequently coated on the glass plates as described in Example 1 except that they were spin coated at 1000 rpm. The optical compensators thus produced on glass plates were evaluated for contrast as described in Example 1. The results are shown in Table 2.

TABLE 2

| Examples | Resin 1 (wt %) | Resin 2 (wt %) | Crosslinker (wt %) | Contrast |
|---|---|---|---|---|
| 2 | Chem Corr 260 (60) | NeoRez R600 (40) | CX100 (5% of NeoRez R600) | Yes |
| 3 | Haloflex HA 260S | | CX100 (5) | Yes |
| 4 | NeoCryl R633 (50) | NeoRez R600 (50) | CX100 (5) | Yes |

As Table 2 shows, these polymers tested as barrier layers all showed good contrast and did not produce any adverse effects by compromising the alignment of the optically anisotropic layer.

The entire contents of the patents and other publications referred to in this specification are incorporated herein by reference.

PARTS LIST 5 compensator according to the present invention
6 compensator according to the present invention
7 compensator according to the present invention
10 substrate
20 orientation layer
30 anisotropic layer
40 orientation layer
50 anisotropic layer
60 barrier layer
78 plane of substrate (or XY plane)
80 XYZ coordinate system
84 optic axis in the anisotropic layer 30
86 optic axis in the anisotropic layer 50
90 UV light 92 roll moving direction
94 alignment direction
160 barrier layer
300 compensator according to the present invention
310 moving substrate
320 orientation layer
330 anisotropic layer
350 compensator according to the present invention
500 polarizer
550 polarizer
600 liquid crystal cell
700 liquid crystal display
θ tilt angle
φ azimuthal angle

What is claimed is:

1. An optical compensator for a liquid crystal display comprising a transparent polymeric support, an orientation layer, and an optically anisotropic layer, in order, and located between the support and the orientation layer, a barrier layer comprising a heat crosslinked polymer impermeable to the components of the support.

2. The compensator of claim 1 wherein said barrier layer comprises a crosslinked melamine, epoxy, phenoxy, alkyd, polyester, acrylic, vinyl or cellulosic resin.

3. The compensator of claim 1 wherein said transparent support comprises a cellulose ester.

4. The compensator of claim 1 wherein said transparent support comprises a polycarbonate.

5. The compensator of claim 1 wherein said optically anisotropic layer comprises a nematic liquid crystal.

6. The compensator of claim 1 wherein said barrier layer comprises a crosslinked polymer derived from a resin containing carboxylic, hydroxyl, amino or epoxy groups.

7. The compensator of claim 2 wherein the crosslinked polymer comprises a crosslinked melamine resin.

8. The compensator of claim 1 wherein the crosslinked polymer is a cellulosic polymer that is a derivative of a nitrocellulose, ethyl cellulose, hydroxyethyl cellulose or a carboxylated cellulose.

9. The compensator of claim 1 wherein the orientation layer is capable of orientation by rubbing.

10. The compensator of claim 1 wherein the orientation layer is capable of orientation through photoalignment using polarized light.

11. The compensator of claim 1 wherein the orientation layer layer comprises a polyvinyl cinnamate.

12. The compensator of claim 3 wherein the nematic liquid crystal is a UV crosslinked material.

13. The compensator of claim 1 wherein the optic axis of the anisotropic layer has a fixed azimuthal angle.

14. The compensator of claim 1 wherein the optic axis of the anisotropic layer has a fixed tilt angle.

15. The compensator of claim 1 wherein the optic axis of the anisotropic layers has a variable tilt angle.

16. The compensator of claim 11 wherein the optic axis of the anisotropic layer has a variable tilt angle.

17. The compensator of claim 1 wherein the optic axis of the anisotropic layer has a variable tilt angle and a variable azimuthal angle.

18. The compensator of claim 1 wherein the anisotropic layers contain a material with positive birefringence.

19. A liquid crystal display comprising a compensator of claim 1.

20. An electronic imaging device comprising an LCD device of claim 19.

21. A method of forming a component of claim 1 comprising aligining the orientation layer using a photo-alignment step.

22. The compensator of claim 1 wherein the transparent polymer support is triacetyl cellulose.

* * * * *